Feb. 15, 1955 R. V. REPPERT 2,702,159

DECIMAL POINT MECHANISM

Filed July 26, 1952 10 Sheets-Sheet 1

INVENTOR.

Richard V. Reppert

Feb. 15, 1955 R. V. REPPERT 2,702,159

DECIMAL POINT MECHANISM

Filed July 26, 1950 10 Sheets-Sheet 2

INVENTOR.

Richard V. Reppert

Feb. 15, 1955 R. V. REPPERT 2,702,159

DECIMAL POINT MECHANISM

Filed July 26, 1950 10 Sheets-Sheet 3

INVENTOR.

Richard V. Reppert

Feb. 15, 1955 R. V. REPPERT 2,702,159

DECIMAL POINT MECHANISM

Filed July 26, 1950 10 Sheets-Sheet 4

INVENTOR.

Richard V. Reppert

Feb. 15, 1955 R. V. REPPERT 2,702,159

DECIMAL POINT MECHANISM

Filed July 26, 1950 10 Sheets-Sheet 5

INVENTOR.

Richard V. Reppert

INVENTOR.

Richard V. Reppert

INVENTOR.
Richard V. Reppert

Feb. 15, 1955 R. V. REPPERT 2,702,159

DECIMAL POINT MECHANISM

Filed July 26, 1950 10 Sheets-Sheet 8

INVENTOR.

Richard V. Reppert

INVENTOR.
Richard V. Reppert

INVENTOR.
Richard V. Reppert

United States Patent Office 2,702,159

Patented Feb. 15, 1955

2,702,159

DECIMAL POINT MECHANISM

Richard V. Reppert, Rochester, N. Y.

Application July 26, 1950, Serial No. 175,990

3 Claims. (Cl. 235—63)

This invention relates to decimal point mechanism for calculating machines and has as its foremost object the provision of a decimal point indicating mechanism for the product register dials of such machines and comprises individual decimal point indicators for said dials, selectively settable to indicating position by the operation of the multiplicand keys inclusive a multiplicand decimal point key and the operation of the multiplier keys inclusive a multiplier decimal point key, when said keys are operated to set up a multiplicand and multiplier factor.

A further object is to provide a decimal point indicating mechanism for a series of dials settable to display the digits of a multiplier and comprises individual decimal point indicators selectively settable by the operation of a multiplier decimal point key, when said key is operated in its proper sequence upon operation of the multiplier keys, to set up the multiplier factor.

Other objects of the invention will be pointed out in the following description and claims and illustrated in the accompanying drawings, which disclose, by way of example, the principle of the invention.

*General description*

For the operation of this machine, two, "ten key" keyboards are provided, one for the multiplicand values and one for the multiplier values and each keyboard comprises a decimal point key.

The operation of the multiplicand keys introduces the multiplicand value by "setting" fulcrum pins in the various rows of a pin carriage, in effective position, the pin carriage being moved step by step between key operations.

The position of a pin in a row represents a digit value and the positioned pins are in cooperative position with register wheel actuating levers and serve as fulcrum points for the levers. The actuating levers are power operated in unison and to an equal extent, but only such of the levers as cooperate with pins that have been set will impart movement to their respective register wheels and the imparted movement varies in extent, according to the position of the cooperating or "set" pins.

The movement imparted to the levers by the power means is of harmonic nature, that is, with gradual acceleration and gradual deceleration and therefore the movement imparted to the register wheels is of gradual acceleration and deceleration, thereby eliminating over rotation.

The register wheels are rotated by means of rack and ratchet drives and any conventional transfer mechanism can be employed.

The decimal point key of the multiplicand keyboard is operated in its proper sequence and its operation sets a decimal point member in a position in which it will cooperate with other devices, to automatically position a visual decimal point indicator in the register dials in its proper position, when they exhibit the product of a multiplication.

The multiplier keys are operated to introduce the multiplier value and this induces rotation of a series of multiplier gears, in proportion to the figures of the multiplier, commencing with the figure of highest decimal value.

A stop carriage, having a single row of stops, cooperates with the multiplier gears, in succession, starting with the leftmost or the one of highest decimal order, to position the gears, to represent the figures of the multiplier and to exhibit them on dials, through an opening in the casing. The multiplier decimal point key is operated in its proper sequence, to position a multiplier decimal point indicator and also functions with other devices, to shift the decimal point indicator of the register, if the multiplier value makes this necessary.

After the multiplier has been introduced, the "M" key or multiplying key is operated and multiplying operation begins. The multiplying operations or cycles, are in accordance with the figures of the multiplier, starting with the multiplier figure as shown on the multiplier gear of highest decimal order. This gear is reset to zero position in as many steps as its figure denotes and for each step, there ensues a multiplying cycle and the same procedure follows for the other multiplier gears, in succession, until they are all reset to zero position.

During the multiplying operation, the multiplicand pin carriage, is moved to a lower decimal order, whenever the multiplier gear of a higher decimal order is reset and the resetting operation is transferred to the multiplier gear of next lower order. The multiplicand is then entered or added, to the register wheels of a lower decimal order.

When the multiplication is completed, the "M" key resets and the register wheels show the product with the decimal point in its proper position.

Then the "C" or clear key is operated to reset the multiplicand and multiplier devices to normal or zero position.

*Multiplicand introducing devices*

Figure 1:
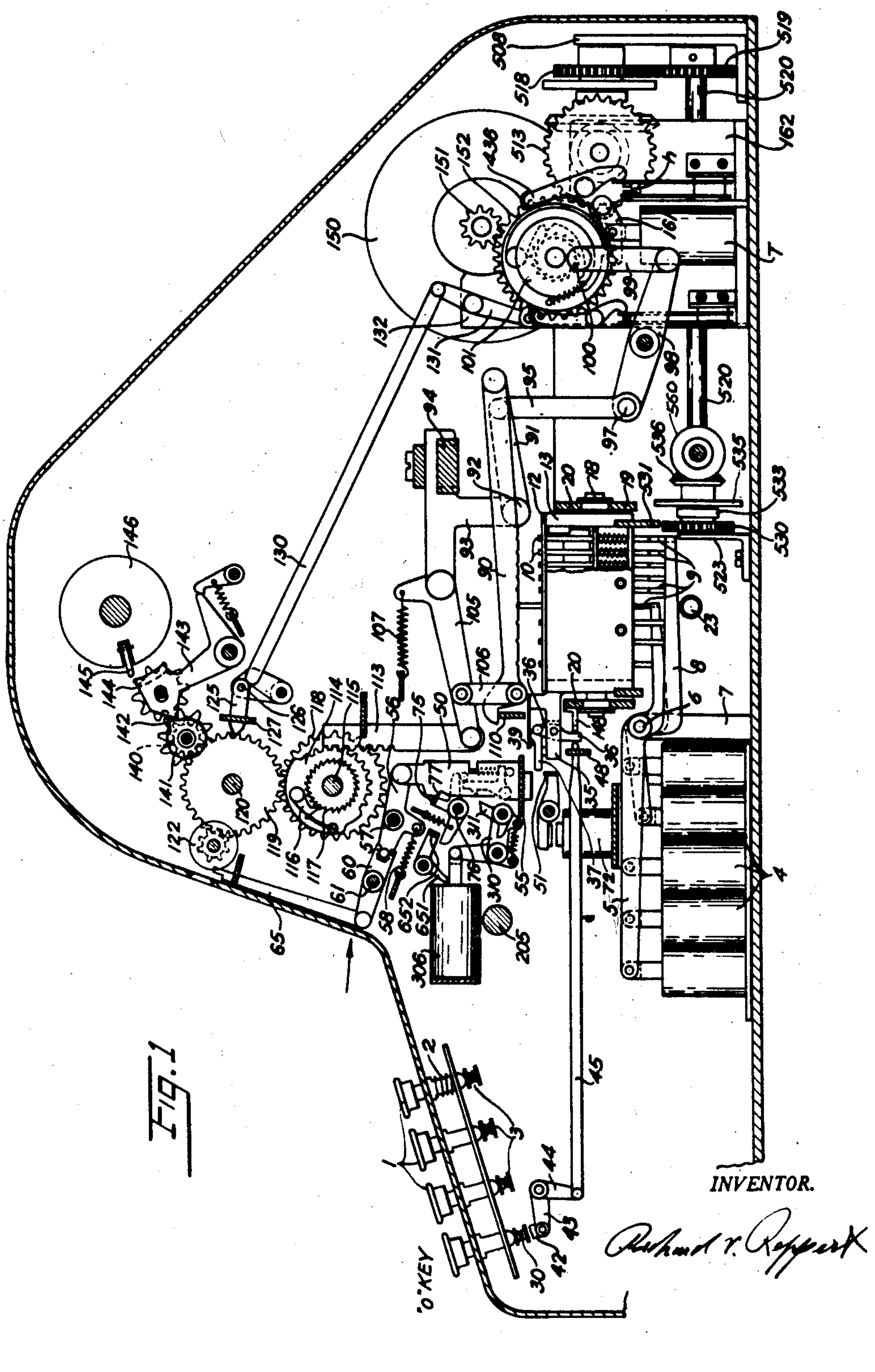
Fig. 1 is a longitudinal sectional elevation.
Figure 2:
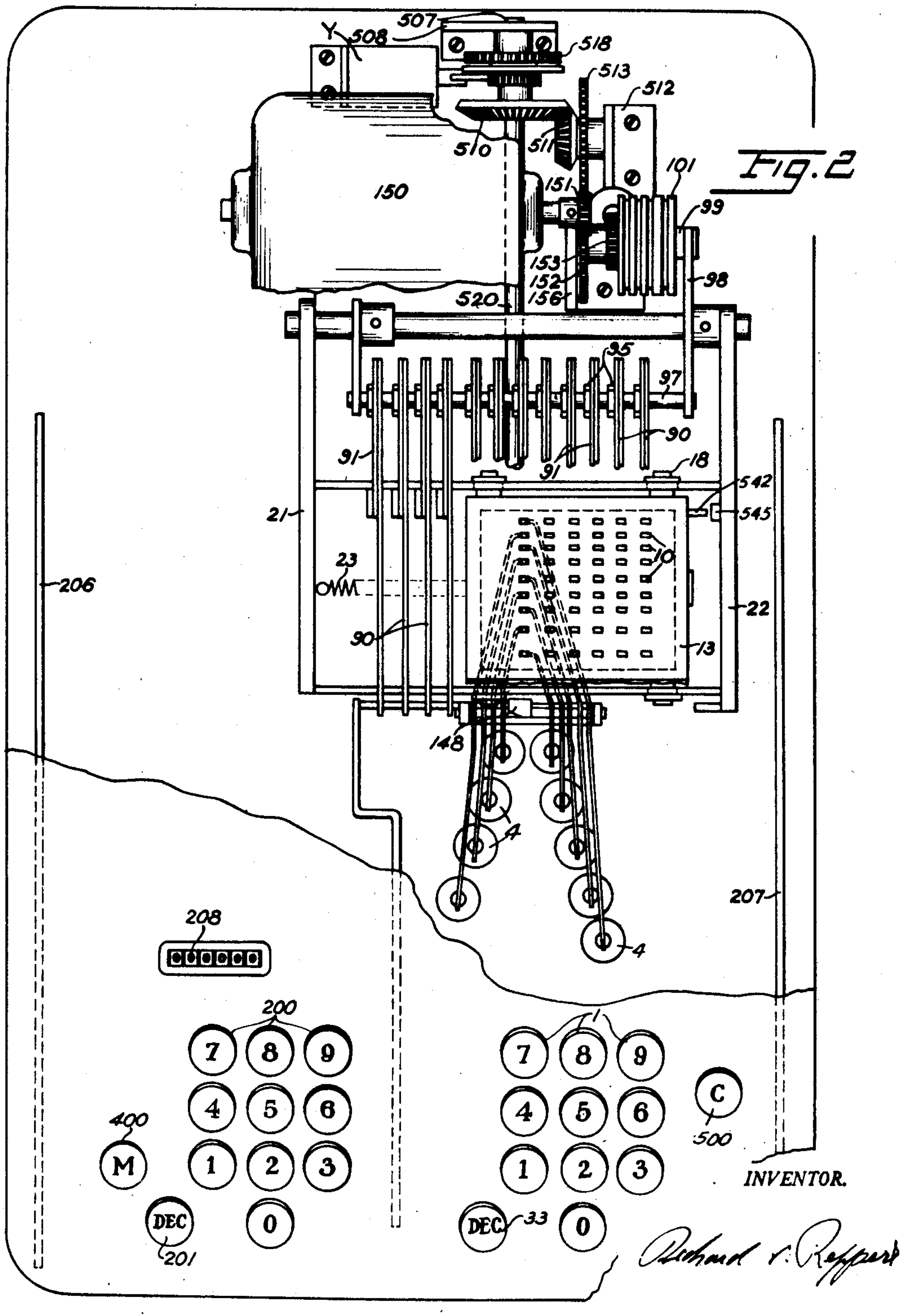
Fig. 2 is a fragmentary plan view of the multiplicand devices.

The term, "ten key" keyboard, as used herein, refers to a keyboard having only ten keys, representing the nine digits and the naught.

The term "pin carriage" is used herein to identify the well known structure used in the adding and calculating machine art and usually consisting of a rectangular frame, mounted to be moved or escaped step by step, to bring a series of rows of settable pins, in succession, into cooperative relation with the key operated setting means. See Figs. 1, 2, 3 and 16. The ten multiplicand keys 1 are depressible against springs 2 to close contacts 3 and this closes the circuit for solenoids 4 which operate levers 5 pivoted on shaft 6 in bracket 7.

The rear extensions 8 of these levers are aligned and have short upward extensions 9 which underlie a row of movable pins 10 which represent the figures of the keys. There are six rows of pins shown and they are slidably mounted in perforations in plates 11 and 12 which are a part of a carriage 13, adapted to move step by step to bring the rows of pins, in succession, into cooperative position with the extensions 9 on levers 8. The pins are held in lower or normal position by springs 14 and each pin has two notches 15 which are engageable by a lock plate 16 pivotally mounted at 17. See Fig. 3. One lock plate is provided for each row of pins and is under spring tension, tending to engage the notches. When a multiplicand key is operated, the respective solenoid actuates its lever 5 and moves the overlying pin upward. During this movement, the lock plate 16 is momentarily cammed out and when the pin has been moved to its upper position the lock plate engages the lower notch 15 therein and locks the pin in raised position. Upon completion of a multiplication, the lock plates 16 are moved to release the notches 15 on all of the pins that have been set. For this purpose a release plate 542 is slidably mounted in the pin carriage and the notches 543 therein engage the upper edges of the lock plates 16. See Figs. 2 and 3. The release plate extends through the carriage frame and is held in position by a spring 544. The resetting movement of the carriage carries it a short distance beyond its normal position so that the projecting end of the release plate is pushed against the stop 545 on the bracket 22 and thereby is moved leftward, see Fig. 3, against the tension of its spring 544. The lock plates 16 are thereby moved out of engagement with the notches 15 on the pins, which will then reset under the tension of their springs 14.

The pin carriage consists of a rectangular frame 13 on which rollers 18 are mounted and the rollers are guided in lower and upper rails 19 and 20 fastened in brackets 21 and 22. A spring 23 tends to move the carriage leftward, looking from the front of the machine (see Fig. 3) and an escapement rack 25 mounted on the carriage is engaged by an escapement pawl 26 which is operated to escape the carriage step by step.

When a digit multiplicand key is operated to close its contact, the current passes through the respective solenoid 4 and then through a solenoid 27 which operates the escapement pawl, so that there is a simultaneous operation of setting a pin in the pin carriage and of operating the carriage escapement, to let the carriage escape a half step. Upon release of the key, the current is interrupted and the escapement pawl moves to normal position under the impulse of a spring 28 and the carriage moves another half step, to bring the next row of pins into alignment with the levers 8. The multiplicand zero key does not set a pin, but it closes a contact 30 to establish a circuit for the solenoid 27 which operates the carriage escapement pawl 26 and thereby escapes the pin carriage one step. See Fig. 16.

The multiplicand key board comprises a decimal point key 33 which is operated in its proper sequence when introducing the multiplicand.

The multiplicand carriage has a forward extending ledge 35 which is slotted to receive a series of small levers 36, one for each row of multiplicand pins and the upper end of each lever has pivoted to it a small lug 37 which rests on the ledge with an off-set extension. A spring 39 tends to hold the lug and lever in normal position and also in forward or set position. The decimal point key stem 42 connects to an arm 43 of a bell crank and the other arm 44 thereof carries a link 45 which is supported, at its rear end by a comb 48. See Fig. 1. This end is normally aligned with the leftmost decimal point lug on the pin carriage, when the carriage is in normal position. Operation of the decimal point key pushes the lower end of the lug lever back and thereby sets the lug to its forward position, where it is aligned with one of a series of decimal point plates 50 and where it overlies a bail frame 51 which is operated to move the lug upward, to actuate the decimal point plate which happens to be aligned with the lug.

A decimal point plate is provided for each register wheel and the lower ends thereof are slidably mounted in the comb plate 55. The upper ends of the plates connect to levers 56 on shaft 57 and springs 58 tend to hold the plates in normal position with the shoulders on the plates resting on the comb 55. A lock detent 75 on shaft 76 is provided for each decimal point plate and is under spring tension to engage a notch 77 on the plate, to hold it in raised position. A small resetting cam 148 for the decimal point lugs, is mounted on the pin carriage rail 20 and when the carriage is reset, at the end of a multiplying operation, the lower ends of the lug levers 36 are moved past the cam and thereby any lever and lug, that has been set in position by the multiplicand decimal point key, will be reset. See Figs. 1 and 2.

Figures 3, 9, 10:
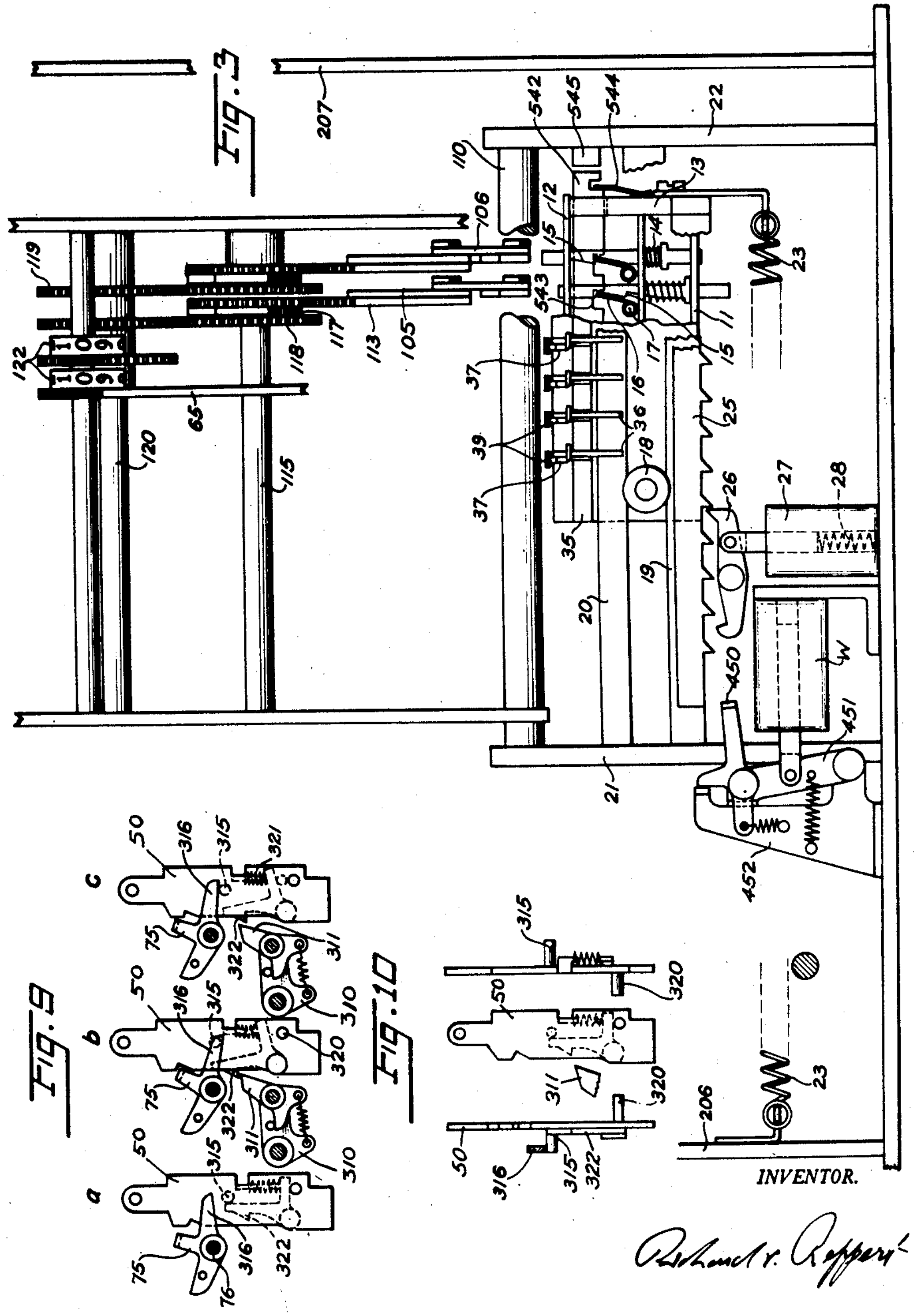
Fig. 3 is a front elevation of the multiplicand carriage and a fragmentary front elevation of the register.
Figs. 9 and 10 are details of the decimal point indicating mechanism.

Motion reversing levers 60 on shaft 61, have a slot and pin connection with the levers 56 and each lever 60 has an upward extending member 65 pivoted thereto, which is positioned to the left of the register wheel dial to which it refers, see Fig. 3. The rod is cut away on top as shown in Fig. 1, so that the edge surface is approximately aligned with the periphery of the register wheel and the surface is preferably marked or colored to identify it as a decimal point indicator. Normally, the decimal point rods are not visible through the casing opening but when a rod has been raised it becomes visible and is established as the decimal point for the figures shown in the register wheel dials.

*Register actuating devices*

The multiplicand pins 10 cooperate with a series of actuating levers 90 for the register wheels. These levers overlie the various rows of pins and the rear ends thereof connect to levers 91 pivoted at 92, to individual support plates 93 mounted in the transverse bracket 94. Links 95 extend down from the levers 91 to a universal bail frame, rod 97 and the rear extension 98 of the bail frame connects by a link 99 to an eccentric mounting 100 on the power driven disc 101. By these means, rotation of the disc imparts harmonic motion of uniform extent, to all of the actuating levers. The front ends of the actuating levers are connected to intermediate levers 105 by links 106 and springs 107 on these levers tend to hold the actuating levers in normal position, with the front ends thereof resting on the transverse plate 110.

A rack 113 is pivotally mounted on each actuating lever and extends upward to engage a gear section on a disc 114 mounted on shaft 115. See Figs. 1 and 3. A spring held pawl 116 on the disc engages a ratchet wheel 117 loosely mounted on the shaft and a gear wheel 118 is attached to the ratchet wheel. This gear engages a gear wheel 119 above it, on shaft 120 and this is the register wheel proper. It has a multiple of ten teeth and a visible dial 122 is geared to it, to show its position through an opening in the casing.

Figure 14:
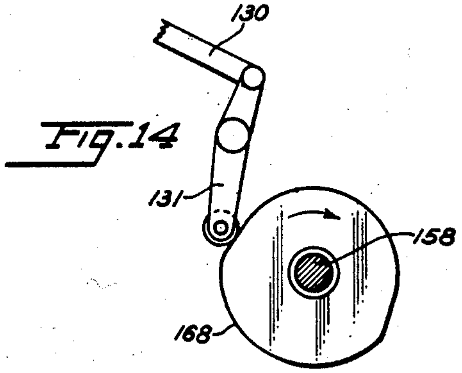
Fig. 14 is a detail of the register detent mechanism.

The register wheels are normally locked against movement by detents 125, mounted on the bail frame rod 126 and guided in comb 127. The bail frame is operated to release the register wheels at the beginning of a rotating cycle of the disc 101 and to relock them at the end of a cycle. A link 130 extends from the bail frame to a cam follower 131 mounted on bracket 156 and a cam 168 connected to the disc 101, is timed to actuate the follower and thereby release and relock the register wheels. See Fig. 14.

As stated, the actuating levers 90 overlie the rows of multiplicand pins and when a pin has been moved to its raised position, it becomes a fulcrum point for the respective actuating lever when the latter is operated. The pins are so positioned that a raised pin establishes a fulcrum for the actuating lever, whereby the actuation of the lever, by its power means, will impart movement to the rack 113 and to the register wheel actuated thereby, of as many unit movements as the digit value of the raised pin denotes.

Any suitable tens transfer mechanism can be provided and I have indicated a well known design, whereby a register wheel rotates a ten tooth pinion 140, to which is attached a larger ten tooth pinion 141 having a tens transfer cam 142 which is adapted to move the tens transfer lever 143, from normal position to "set" position, in which the cam portion 144 on the lever will move the laterally swingable pin 145, on the respective actuating disc 146, into engagement with the ten tooth pinion 144 of the next higher decimal order, when the actuating disc 146 is actuated. Thereby the pinion is rotated one tooth space and also the associated register wheel. Suitable means are provided to release the register wheels for tens transfer movement and to relock them.

*Power drive*

See Figs. 1, 2, 12, 13 and 14. The power to move the various mechanisms is derived from a continuously rotating motor 150, mounting a pinion 151 on its shaft, which engages a gear 152 on a stud shaft 158 in bracket 156. A ratchet wheel 153 is attached to the gear 152 and is engageable by a detent 155 mounted on a disc 157 loose on the stud shaft 158. See Fig. 13. A spring 160 tends to engage the detent with the ratchet, but the detent is normally held out of engagement by a release lever 161 pivoted on the bracket 162. This lever normally engages the extension 164 on the clutch detent and holds it out of engagement with the ratchet wheel and is held in this position by a spring 166. A solenoid T is provided to actuate the release lever and upon such actuation, the clutch detent engages the ratchet wheel and rotates it and the parts associated therewith. Several members are connected to the driven disc 157 and one of these is the disc 101, to which the eccentrically mounted link 99 is connected.

A cam 168 is also connected to the disc 157 and is timed to cam out the follower 131 which actuates the register wheel lock detents at the beginning of a rotating cycle and resets them at the end of one half clutch cycle, as then the register wheels have been actuated and the actuating levers commence resetting movement.

*Multiplying mechanism*

This includes the multiplier key board mechanism, which is operated to introduce the multiplier; the multiplying devices, which are power operated to perform multiplying operations and the decimal point indicator devices, which are operated to position the decimal point indicator for the register in position to indicate the decimal part of the product.

As the operation of the multiplying keys and of the multiplying devices, have a part in the positioning of the decimal point indicator, it may be well to briefly explain the functions of these mechanisms, before giving a detailed description thereof.

When a multiplicant such as 732.50 is introduced by the operation of the multiplicand keys, a decimal point lug is selected and positioned in cooperative alignment with a decimal point plate, as described. Means are provided to position the respective decimal point indicator, upon operation of the first key of the multiplier key board, so that the decimal point appears in the register dials, before any multiplying operations have taken place.

This position of the decimal point is correct only if the multiplier, which is about to be introduced, is a quantity with one or no figure to the left of the decimal point, such as 6.75 or .075, but for a quantity with more figures to the left of the decimal point, the decimal point indicator will be reset and another one will be positioned.

The rule is, that when a multiplier has more than one figure to the left of the decimal point, the decimal point of the register must be positioned as many decimal orders to the right as there are more than one figure to the left of the decimal point in the multiplier, so that if, for instance, the multiplier is represented by the figures 6935.50, the decimal point in the register is positioned three decimal orders to the right from its original position.

There are twelve register wheels shown in the present machine and the six rows of multiplicand pins are normally aligned with the six right hand register wheel actuating levers. The introduction of the multiplicand into the pin carriage, progresses from right to left and multiplying operations, progress from left to right. It will be seen from this, that a six figure multiplicand is the maximum and positions the leftmost multiplicand figure in alignment with the leftmost register wheel. The multiplication proceeds from left to right, starting with the leftmost figure of the multiplier and after the adding operations in a decimal order have been completed, in accordance with the figure of the multiplier, the multiplicand pin carriage is moved one step or decimal order to the right, where the adding operations will proceed in accordance with the multiplier figure of next lower decimal order.

Normally the register wheels stand at zero, thus 000000000000 with the six rows of multiplicand pins aligned with the actuating levers for the six right hand register wheels. If a multiplicand such as 864.73 is set up in the multiplicand pin carriage, the leftmost row of pins is in cooperative position with the actuating lever for the second register wheel from the left. Now a multiplier such as 322.50 is set up and the operation of the digit key 3 positions the decimal point indicator in the register dials, so that they stand thus: 0000.00000000. During the setting up of the other figures of the multiplier 22.50, the indicator is repositioned two decimal orders to the right, so that the register will now stand thus 000000.000000 and after completion of the multiplication, the register stands thus 278875.425000 with the decimal point in its proper position. If the multiplier is 3.225, the decical point indicator will be set in position by the operation of the first figure of the multiplier, that is, the digit 3 and will remain in this position, so that the multiplication of 864.73 by 3.225 will position the register dials thus: 2788.75425000. If the multiplier is .03225, the decimal point indicator is set in position by the operation of the decimal point key and remains set in this position, so that the multiplication will position the register dials thus: 0027.88754250. It will be seen that the multiplying or adding values were entered into register wheels of lower decimal value, by reason of the step by step movement of the multiplicand pin carriage during multiplying operation.

*Multiplier introducing mechanism*

The multiplier key board comprises the ten figure keys 200 and a decimal point key 201. The operation of these keys, introduces the multiplier figures, by rotating a series of multiplier gears 204, in succession, in proportion to the figures of the multiplier and such rotation begins with the leftmost or multiplier gear of highest decimal order. These gears are mounted on a shaft 205 in the frame work consisting of the plates 206 and 207 and each gear has a visible dial 208 and is under tension of a spring 209 tending to rotate it, but is held against rotation by a detent 210.

Each gear has a peripheral projection 215 which cooperates with any one of the stops 216 in a stop carriage 217, when a stop has been raised, to intercept the projection on the gear, that has been released for rotation. The stop carriage has one row of stops and is adapted to have step by step movement to bring the row of stops, in succession from left to right, into cooperative position with the multiplier gears.

A stop member 216 is provided for each digit key except the nine digit key and for this position the gear is stopped by contacting the bar 218 which extends through the perforations of the gears. This bar is connected to rotate with the shaft 205 after a multiplication has been completed, to reset various devices to normal position. The stops 216 are slidably mounted in the plates 220 and 221 of the carriage and flat springs 222 bear on lateral pins 223 on the stops and tend to hold them in normal position, see Figs. 5 and 6. The carriage is slidably mounted on the rods 224 and springs 225 tend to move the carriage for step by step movement. An additional stop member 230 is provided and is positioned to actuate the gear detent 210 to release the gear for rotation.

For each multiplier digit key, a stop setting lever 231 is provided and is pivotally mounted on shaft 232 in bracket 233. The forward extensions of the levers are operable by solenoids 240 and the circuits for the solenoids are under control of the multiplier keys 200 which close contacts 199 upon being operated. The rear extensions of the levers underlie transverse members 245, which, in turn, underlie the stops 216. See Fig. 6. Each of these transverse members is connected to two links 246 and 247, mounted in bracket 248 and the member extends laterally, so that it is cooperative with the overlying stop, in any position of the stop carriage. Each of the levers 231 has a projection 250 to actuate its overlying transverse member and also has a projection 251 to actuate the transverse member which releases the detent for the multiplier gear. From the foregoing it will be seen that the operation of a multiplier key simultaneously sets a stop and releases a multiplier gear for rotation against the stop.

As stated, the stop carriage is subject to step by step movement, from left to right, to bring the stops, in succession, into cooperative position with the multiplier gears and for this purpose an escapement rack 260 is mounted on the rear carriage member 217 and cooperates with an escapement pawl 262 on bracket 263. See Fig. 7.

A magnet 264 is in the circuit with the lever solenoids 240, so that the depression of a multiplier key, releases a multiplier gear, stops it in set position and operates the escapement pawl, to let the carriage escape one half step, under the tension of its springs 225. The release of the multiplier key, opens the circuit, so that the escapement pawl will reset, under the impulse of its spring 226 and the carriage will escape another one half step, to thereby position the stop carriage in cooperative position with the multiplier gear of next lower decimal order. The zero key merely closes the circuit for the escapement magnet 264, to escape the stop carriage one step. See Fig. 15.

The decimal point key 201 of the multiplier key board is operated in its proper sequence and upon operation actuates a bell crank 271 and closes contacts 272 and 284. A link 273 extends from the bell crank to a lever 274 on a bail frame 275 on shaft 276 in bracket 233. See Figs. 4, 5, 6. The rail 277 of the bail frame underlies a pin 278 slidably mounted in the stop carriage and the upper end of the pin is adapted to cooperate with a cam 280 formed on the downward extension of a lever 281 on shaft 282, mounted in the multiplier gear section. A lever 281 is provided for each multiplier gear and the upward extending arm of the lever is offset to position it to the left of the multiplier gear dial to which the lever relates. A short flat edge 286 is provided at the very upper end of the lever and is marked in some manner to identify it as a decimal point indicator. See Fig. 5. This decimal point indicator is not visible through the opening in the casing unless the decimal point key has been operated to raise the pin 278 and thereby oscillate the lever 281 which happens to be in cooperative position with the pin. Such operation moves the indicator backwards, into alignment with the dial periphery, where it becomes visible through the casing opening.

As stated, the decimal point key closes the contacts 272 and 284 and this closes two circuits conditionally, that is, when the stop carriage is in normal leftward position (see Figs. 4, 6 and 15) it holds contacts 290 and 285 in closed position, so that the closing of the contact 272 by the decimal point key, together with the closed position of contact 290, closes the circuit for the solenoid W (Fig. 3) which functions to back-space the multiplicand pin carriage one step to the right or to the register actuating devices of one lower order.

The other circuit extends from the contact 284 to the contact 285, which is also held in closed position when the stop carriage is in first or leftmost position and then extends to the magnet 72, which functions to raise the decimal point plate 50, that has been selected by the operation of the multiplicand decimal point key, as has been described. A bail frame 51 (see Figs. 1 and 4) is mounted to underlie any one of the lugs 37 that may have been set in position by the operation of the multiplicand decimal point key as described and the energization of the magnet 72 actuates the bail frame to move the lug upward to thereby move the decimal point member 50 which is aligned with the particular lug upward to its set position where it is locked by its detent 75. The bail frame extends laterally to be cooperative with any lug that may be selected for positioning a decimal point indicator.

Figure 15:
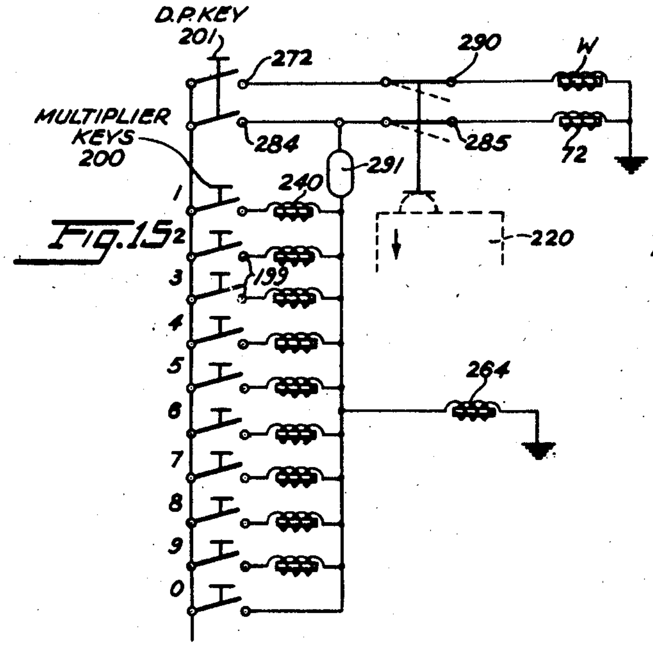
Fig. 15 is a circuit diagram for the device operated by the multiplier keys.
Figure 16:
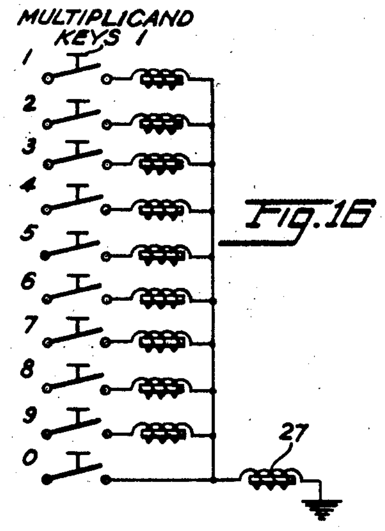
Fig. 16 is a circuit diagram for the devices operated by the multiplicand keys.
Figure 18:
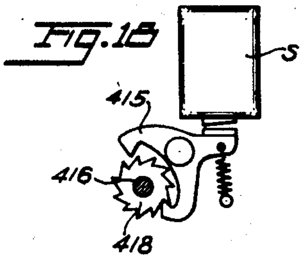
Fig. 18 is a detail of the cam shaft which is rotated to shift the operating cycle control from one multiplier gear to the next one.

The magnet 72 is also subject to energization by the operation of the multiplier digit keys 200 which close contacts 199 upon being operated. As shown in Figure 15, the circuit extends from any one of the contacts 199 to the magnet 72, so that operation of any multiplier digit key induces operation of the magnet and thereby actuation of the bail frame 51. The operation of the decimal point key after a digit key has been operated, will not operate the magnet 72, because the operation of the digit key has moved the stop carriage to the next lower order gear and has thereby opened the contacts 290 and 285. In order to prevent a back circuit to the magnet 264, which functions to escape the multiplier stop carriage from one multiplier gear to the next one, in the course of introducing a multiplier by the operation of the decimal point key, a small rectifier unit 291, such as a germanium crystal diode, is interposed in the circuit leading from the multiplier keys, to the magnet 72, see Fig. 15.

*Automatic positioning of the register decimal point*

In a foregoing paragraph it is stated that the register decimal point is re-positioned during the setting up operation of the multiplier and now the devices whereby this is accomplished will be described.

It has been described, how the operation of the multiplicand decimal point key, or the operation of the first key of the multiplier, sets up the decimal point indicator 65 in the register, by raising a decimal point plate 50 to its "set" position, where it is locked by its detent 75. When a decimal point plate is moved or raised, it releases the lock detent 75 of its left neighbor plate and also conditions its right neighbor plate to be raised by actuating means, universal for all plates. See Fig. 4. The upper multiplier stop carriage plate 220, is formed to have a series of cams 300, which cooperate with a follower 301, mounted on a lever 302, pivoted on bracket 303. The first step movement of the carriage to the right, does not actuate the follower, but the following step movements will and thereby the follower is actuated to close a contact 305, which closes the circuit for a solenoid 306 (Fig. 1) which actuates a swingable frame 310, carrying a series of small pawls 311.

The pawls 311 are operatively aligned with pawls 322 mounted on the decimal point plates 50 and, upon actuation of the frame 310, will engage the particular pawl 322 which has been set in forward or engaging position, and move the respective plate 50 upward to set position where it will be locked by the detent 75. The plates 50 are interconnected in such manner that the positioning of one plate to its set position, will reset to normal position its neighbor plate, relating to the register gear of the next higher decimal order, and condition its neighbor plate, relating to the register gear of the next lower decimal order for setting operation upon the next actuation of the pawl frame 310. Fig. 10 shows from left to right a front elevation, a side elevation and a rear elevation of a plate 50. As shown in the front elevation, a pin 315 extends leftward from the plate and underlies a member 316 shown in section and a pin 320 extends to the right from the plate. In Fig. 9 three adjacent plates 50 are shown and are identified as plates "*a*," "*b*" and "*c*" and the plate "*b*" is shown in raised or set position where it is locked by its detent 75. The frame 310 is shown in actuated position with the pawl 311 engaging the pawl 322 on plate "*b*." A pin 315 extends leftward from the plate and underlies the arm 316 of the detent 75 of the adjacent plate "*a*" (see Fig. 10) and as shown, has moved the detent to release position with the plate "*a*" reset to normal position under the impulse of the spring 58 on the lever 56 (see Figs. 1, 9 and 10). A pin 320 extends to the right from plate "*b*" and underlies the rear extension 321 of the pawl 322 on the adjacent plate "*c*." The plate "*b*," as shown in set position, has oscillated the pawl 322 of plate "*c*" to move the nose thereof forward into the position in which it will be engaged by the respective pawl 311 when the pawl frame 310 is actuated. Such positioning movement of plate "*c*," disengages the lock detent 75 of plate "*b*," and lets it move down under the impulse of the spring 58 on the lever 56 connected thereto. Every time the multiplier carriage closes the contact 305 and actuates the pawl frame 310, a decimal point plate is raised and the one to the left thereof is reset, thereby moving the decimal point of the register, step by step to the right, until it is positioned in accordance with the figures of the multiplier.

In accordance with the rule, that the decimal point of the register is moved one step or decimal order less to the right, than there are figures to the left of the decimal point of the multiplier, the multiplier carriage does not actuate the cam follower during the first step to the right when the figures of the multiplier are set up.

When the multiplier is a complete decimal fraction, the first key operated will be the decimal point key and in this case the decimal point of the register is not shifted. See Figs. 5 and 6. Therefore provision is made to disconnect the decimal point shifting mechanism and a link 350 extends rearward from the lever 274 operated by the decimal point key 270 and connects to a holding detent 351 which holds the lever 302 in position against the tension of the spring 352. See Figs. 4 and 5. Operation of the decimal point key releases the lever 302 and thereby moves the cam follower 301 out of range of the cams 300. When, at the end of a multiplication, the multiplier stop carriage is reset, it is moved a short distance beyond its normal position, so that the extension 355 on lever 302 is engaged by the stop carriage frame and thereby resets the lever 302 to normal position, where it is reengaged by the detent 351.

The described disconnecting means for the decimal point shifting mechanism will also function to interrupt the shifting operation when the decimal point key is operated in its proper sequence when introducing a multiplier having a plurality of significant digits to the left of the decimal point.

In this machine, the multiplicand is first added into a group of register wheels as often as the digit of the multiplier gear of highest decimal order denotes and then the multiplicand, as set up in the multiplicand pin carriage, is moved to register wheels of one lower decimal order and is then added as often as the digit of the multiplier gear of next lower decimal order denotes, etc. If a multiplier gear denotes a zero, there are, of course, no adding operations and the multiplicand is moved to the register wheels of next lower decimal order.

In the course of the adding operation, the multiplier gears are reset to normal or zero position, so that, if the multiplier gear of highest decimal order stands at "9" for instance, it will be reset, in succession, to 8, 7, 6, etc. to zero and when it is reset from "1" to "0" it actuates means to terminate the adding operations into the register wheels, then cooperating with the multiplicand devices and induces the shifting of the multiplicand devices, to the register wheels of next lower decimal order and furthermore, the shifting of the multiplier gear resetting devices, to the multiplier gear of next lower decimal order.

*Multiplying operation*

Figure 12:
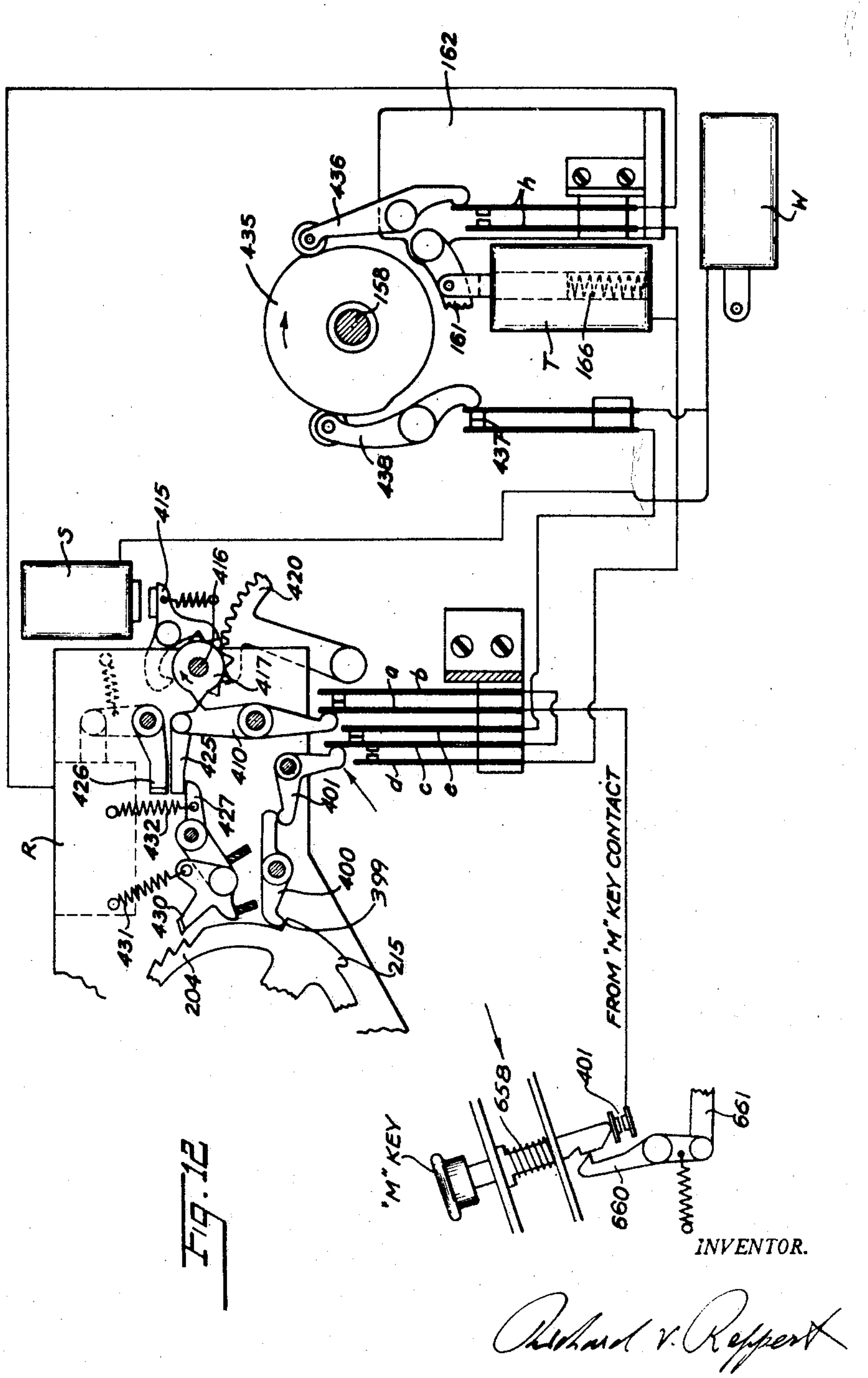
Fig. 12 is a fragmentary view of the multiplier mechanism, showing the circuits for the operating magnets.
Figure 13:
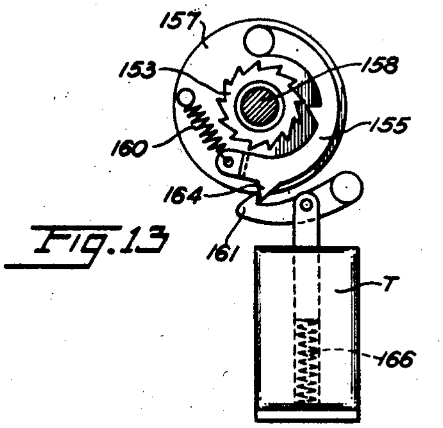
Fig. 13 is a detail of the clutch mechanism.

To initiate multiplying operation, the "M" or multiplying key 400 is operated and closes a contact 401, thereby establishing a circuit to the contact "*a*." See Fig. 12. This contact is normally in contact with contact "*b*," so that the circuit extends to the contact "*c*" which is normally in contact with contact "*e*," that is, if no multplier has been set up in the multiplier gears. See Figs. 12 and 15.

For each multiplier gear, there is a group of contacts *a, b, c, d, e,* mounted on the usual spring blades and if a multiplier digit has been set up in the multiplier gear of highest decimal order, the circuit will extend from contact "*a*" to "*b*," to "*c*" and to "*d*" and from here to the contact "*h*," which is normally open and to the solenoid T, which operates the clutch release lever 161, to let the clutch detent 155 engage the continuously rotating clutch ratchet wheel 153 and thereby induce an operating cycle. See Figs. 1, 5, 12, 13 and 20.

From the contact "*h*" the circuit extends to the solenoid "R," which operates the multiplier gear resetting detent 430, for the multiplier gear of highest decimal order. See Figs. 5 and 12. Upon rotation of the cam 435 on the clutch, it will actuate the follower 436 to close the contact "*h*" and thereby operate the solenoid "R" to reset the multiplier gear of highest decimal order one tooth and upon one half revolution of the cam, the follower resets, to open contact "*h*" and thereby induces resetting of the plunger of solenoid "S" and of the detent 430, so that it will engage the next tooth on the multiplier gear.

The clutch will continue to rotate and the described cycle of operations will be repeated until the last tooth of the multiplier gear is reset. When this happens, the projection 399, on the multiplier gear, will actuate the levers 400 and 401 and thereby move contact "*c*" to open its contact with contact "*d*" and to close it with contact "*e*." This opens the circuit to the solenoid "T," which will therefore reset the release lever 161, so that the clutch detent 155 disengages the ratchet wheel, at the end of the cycle and thereby terminates the operating or adding cycles.

Figure 5:
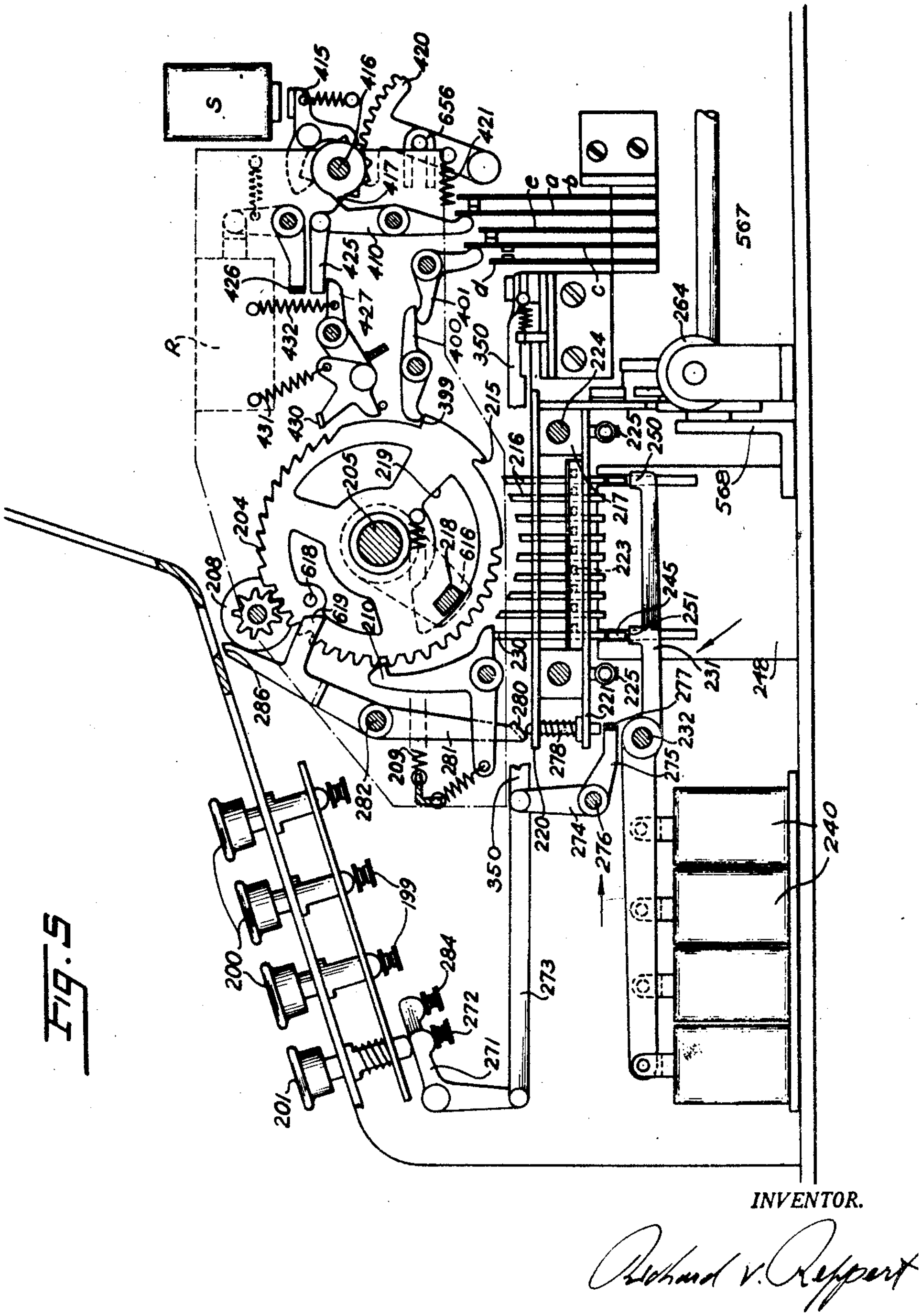
Fig. 5 is a side elevation of the multiplier mechanism and the multiplier introducing devices.
Figure 6:
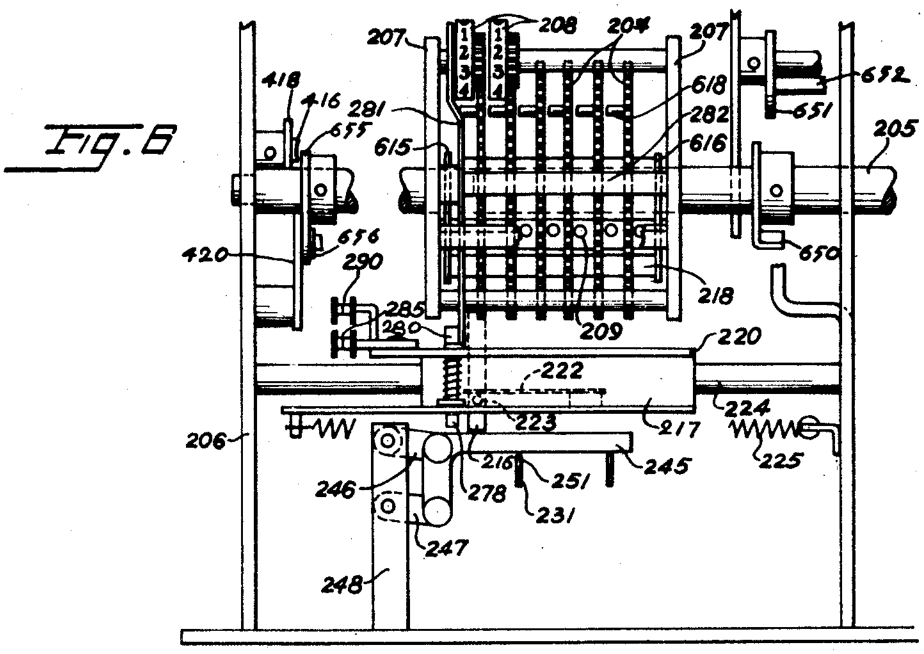
Fig. 6 is a front elevation of the multiplier introducing devices.
Figures 8, 11:
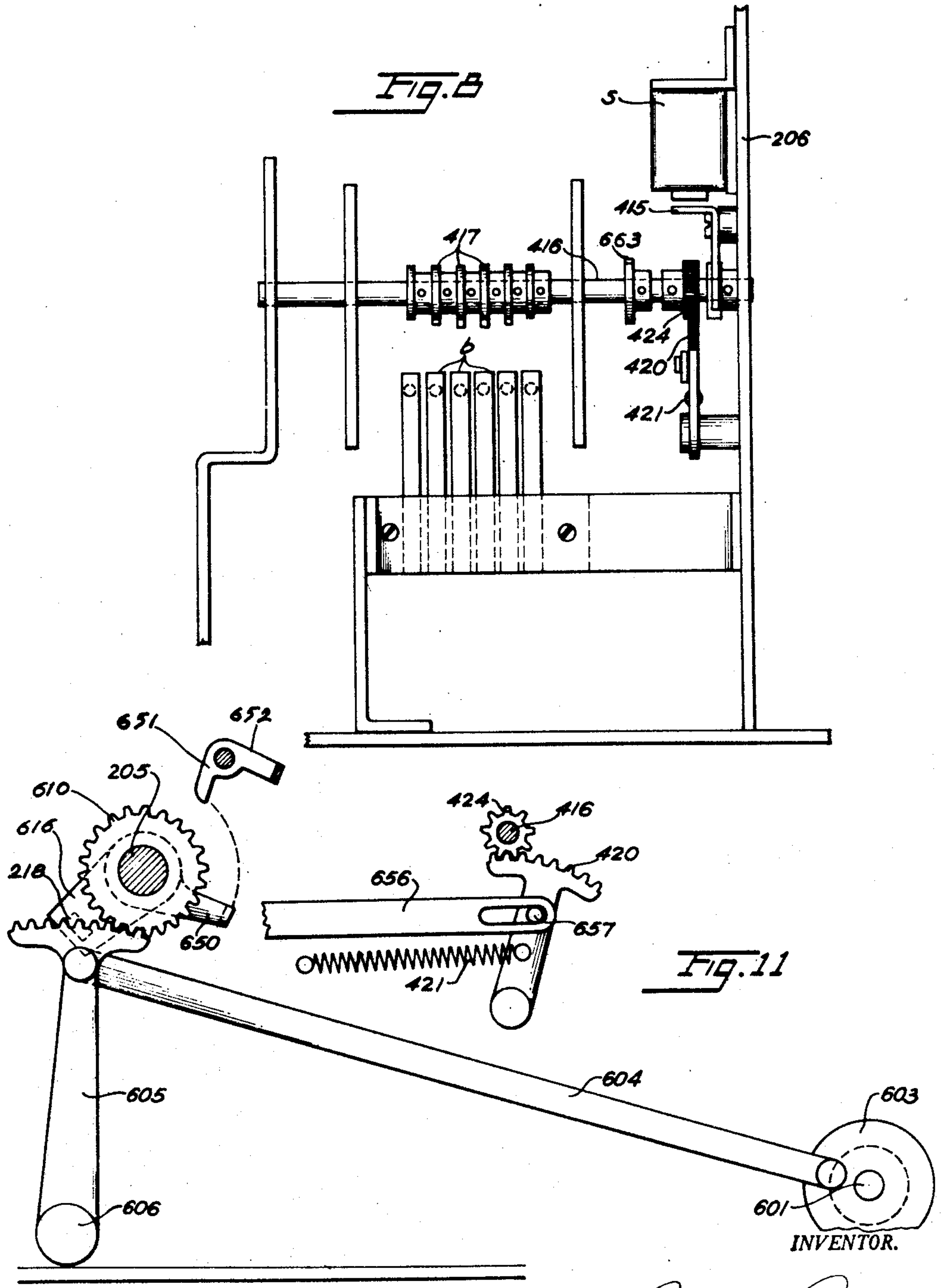
Fig. 11 is a detail of the devices operated by the clear key.

The closing of the contacts "*c—e*," closes the circuit for the magnet "S" which operates an escapement lever 415 for an escapement wheel 418 on a shaft 416, on which a series of cams 417 are mounted in a staggered or helical arrangement. The shaft 416 is under spring tension to rotate by means of a gear 424, a sector 420 and a spring 421. See Fig. 11. The cams 417 cooperate with follower levers 410, one for each multiplier gear and normally, the one for the leftmost multiplier gear is in the position as shown in Figs. 5 and 12, with a floating lug 425, pivoted thereto, moved forward to underlie an actuating bail frame 426, so that operation of the bail frame will actuate a lever 427 to which is mounted a feed pawl 430, for the resetting of the multiplier gear.

There is a lever 427 and a pawl 430 for each multiplier gear and they are held in normal position by springs 431 and 432. Operation of the magnet "S" moves the escapement lever 415 in one direction to escape the cam shaft one half space and this movement causes the follower lever 410 to move off of its cam 417 and thereby move the lug 425 thereon, out of cooperative position with the bail frame 426. Simultaneously, the lower end of the follower lever opened the contacts "*a—b*," so that the circuit to the magnet "S" is broken and the escapement lever resets and lets the cam shaft 416 rotate another half tooth space. This movement of the cam shaft brings the cam for the multiplier gear of next lower order into position to actuate its follower lever and thereby move its lug 425 into cooperative position with the bail frame and also closes the contact "*a—b*" for the multiplier gear of the next lower order.

If this gear is set in position to represent a figure of the multiplier, the circuit is closed through contacts "*a—b*" to "*c—d*" and to the clutch solenoid and contact "*h*," with the result that a new series of operating cycles will ensue, in accordance with the figure represented by the second multiplier gear.

When the adding operations or cycles, controlled by a multiplier gear are completed and the control of the cycles is shifted to the multiplier gear of next lower order, it also becomes necessary to shift the adding operation from the connected group of register wheels, to the group of register wheels of one lower decimal order. To accomplish this, the multiplicand devices, represented by the multiplicand pin carriage, are moved to cooperate with the actuating levers, for the register wheels of one lower decimal order.

The circuit which extends from contact "*e*" to the magnet "S," which shifts the cycle control from one multiplier gear to the next one, also extends to the solenoid "W" (see Figs. 3, 12 and 15) which actuates a pawl 450 on lever 451 pivoted in bracket 452, to engage the escapement rack 25 on the multiplicand pin carriage and to move it one space or decimal order to the right, to thereby position the pins 10 therein in cooperative position with the actuating levers 90 for the register wheels of one lower decimal order. In order to obtain proper timing for the operation of the magnet "S," which shifts the operating cycle control from one multiplier gear to the gear of next lower order and proper timing for the magnet "W" which moves the multiplicand pin carriage, to the actuating levers for the register wheels of next lower order, the circuit for these magnets is controlled by a cam on the operating clutch, so that these devices will function only upon completion of a clutch cycle. A follower 438 cooperates with the cam 439 to close a contact 437 thereby closing the circuit for the said magnets. See Figs. 12 and 20.

Upon completion of the adding cycles for the last of the six multiplier gears, the cam shaft is escaped one space more, when the last multiplier gear is moved from 1 to 0 and this movement is utilized to release the holding detent for the "M" key so that it resets and opens the line circuit. Upon operation of the "M" or multiplying key, it is locked in depressed position by a detent 660 which engages a notch on the key stem. A link 661 extends from the detent to a cam follower 662, which cooperates with a cam 663 on the shaft 416 that is rotated during multiplying operation, as described. When a multiplying operation has been completed, the shaft 416 is rotated or escaped one more step to thereby move the cam 663 thereon, to actuate the follower 662 and, through the described means, release the detent 660 from the "M" key, which then resets under the tension of its spring 658 and opens the line contact 401. See Fig. 12.

*Clearing operation*

A "C" or clear key 500 is provided and is operated upon conclusion of a multiplying operation, to reset the various devices to normal position.

Figure 17:
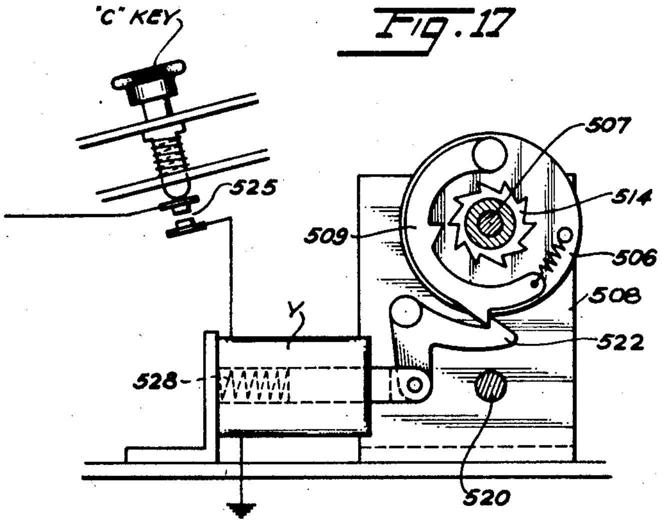
Fig. 17 is a detail of the clutch mechanism operated by the clear key.
Figure 20:
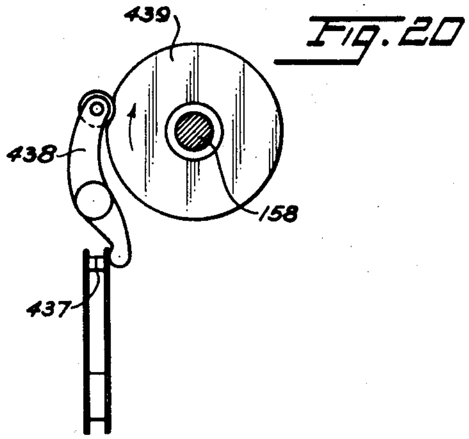
Fig. 20 is a detail of the circuit control cam.
Figure 21:
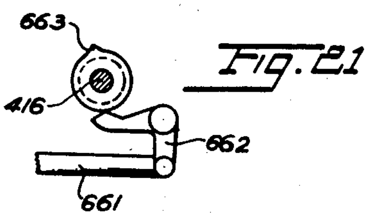
Fig. 21 is a detail of the multiplier key resetting device.

As described, the motor pinion 151 drives a gear 152 (see Fig. 2) and a gear 513, mounted on the bracket 512 engages the gear 152. A bevel gear 511 is connected to gear 513 and drives a larger bevel gear 510 mounted on a stud shaft 507 in bracket 508. A clutch ratchet wheel 514 is connected to the bevel gear 510 and is continuously rotated by the described gearing. Adjacent to the ratchet wheel and on the same shaft 507, a clutch detent disc 506, carrying a detent 509 is loosely mounted (see Fig. 17) and a gear 518, attached to the disc 506 meshes with a gear 519, tight on a shaft 520, rotatably mounted in bracket 508 and 523 (Fig. 1). The clutch detent 509 is normally held out of engagement with the clutch ratchet wheel 514 by a release lever 522 and the operation of the clear key, closes a contact 525 to thereby close a circuit for a solenoid "Y" which actuates the release lever 522, to release the detent for engagement with the ratchet wheel 514. After one revolution of the clutch disc 506 and the shaft 520, the clutch detent is disengaged from the ratchet wheel by the release lever 522 which has been reset by its spring 528.

Figure 19:
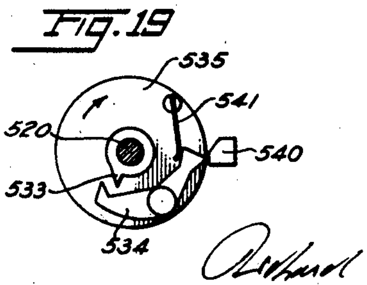
Fig. 19 is a detail of the multiplier stop carriage reset mechanism.

On shaft 520 and adjacent to the bracket 523, a gear 530 is loosely mounted and meshes with a rack 531 fastened to the multiplicand carriage frame. See Figs. 1, 4 and 19. A single tooth ratchet wheel 533 is attached to the gear 530 and is engageable by a detent 534 on a disc 535, mounted on the hub of a bevel gear 536, tight on shaft 520. The detent 534 is normally held out of engagement with the ratchet wheel by a cam pin 540, in the bracket 523, and the pin cams the detent out of engagement, against the tension of the detent spring 541, near the end of one revolution of the shaft 520. As shown in Fig. 19 the shaft 520 rotates one revolution, clockwise and in so doing, the detent drops off of the cam pin 540 and engages the tooth on wheel 533, in whatever position the wheel has been rotated by the escapement movement of the multiplicand carriage which rotates the ratchet wheel anti-clockwise and resets the carriage to normal position. Near the end of this revolution, the detent engages the cam pin 540 and is disengaged from the ratchet tooth.

Figure 4:
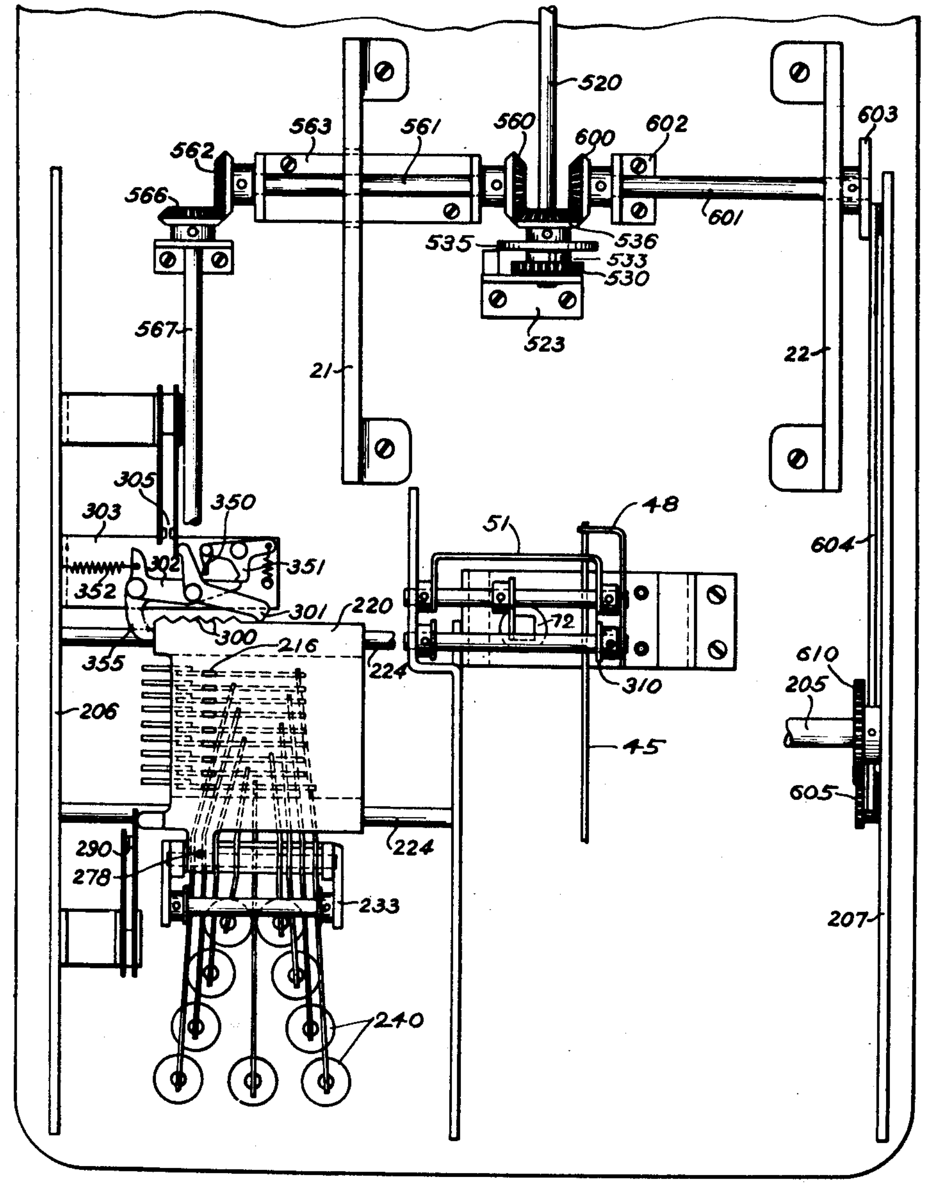
Fig. 4 is a fragmentary plan view of the multiplier devices.
Figure 7:
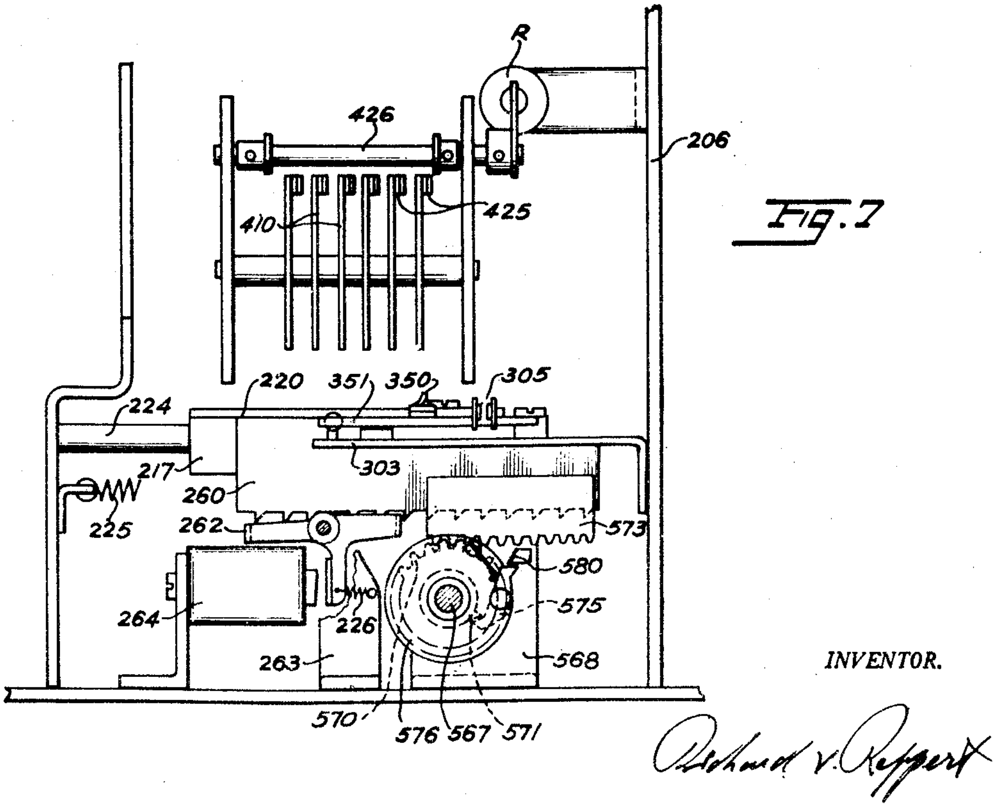
Figs. 7 and 8 are rear elevations of the multiplier mechanism.

A bevel gear 560 engages the bevel gear 536 on shaft 520 and the shaft 561 on which the bevel gear 560 is mounted, extends toward the left side of the machine and mounts a bevel gear 562, adjacent to the bearing bracket 563, for shaft 561. See Fig. 4. A bevel gear 566, on a shaft 567, meshes with the bevel gear 562 and the shaft extends forward and has a bearing in a bracket 568. See Fig. 7. A gear 570, with a single tooth ratchet wheel 571 attached thereto, engages a rack 573, fastened to the multiplier stop carriage frame 217. As described, the multiplier stop carriage is escaped step by step from right to left, as seen in Fig. 7, thereby rotating the gear 570 and the attached ratchet wheel, anti-clockwise. A detent 575, mounted on a disc 576, tight on shaft 567, is adapted to engage the tooth on the ratchet wheel, upon rotation of the discs, and rotate the ratchet wheel clockwise to normal position; thereby moving the multiplier stop carriage to normal position. As described, the clutch driven shaft 520 makes one revolution, upon operation of the clear key and the bevel gear connection to shaft 567 is such that this shaft also makes one revolution to reset the multiplier stop carriage. Near the end of a revolution, the detent 575, on disc 576, engages a cam pin 580. in bracket 568 and is cammed out of engagement with the tooth on the ratchet wheel 571. This disengagement takes place when the stop carriage has been moved a short distance beyond its normal position, so that the carriage frame engages the lever 355 (see Fig. 4) and moves it, to thereby set the cam follower 301 to normal position, as shown in Fig. 4.

A bevel gear drive extends from the clutch driven shaft 520 to the right side of the machine. (See Fig. 4.)

A bevel gear 600, on shaft 601, is driven by the bevel gear 536 on shaft 520 and the shaft has bearings in brackets 602 and 22. See Figs. 4 and 11. A disc 603 carrying an eccentrically mounted link 604, is mounted on shaft 601 and the link extends forward to connect to a sector 605, pivotally mounted at 606. The sector meshes with a gear 610 on the shaft 205 which extends across the machine, with bearings in the machine side plates.

By the described means, a rotation of the shaft 520, imparts a reciprocatory movement to the sector 605 and an oscillatory movement to the shaft 205. See Fig. 6. Two levers 615 and 616 are mounted on the shaft, adjacent to the multiplier gears and the bar 218 extends through perforations in the multiplier gears and connects to the two levers. When a wrong digit or figure has been set up in the multiplier gears, the clear key is operated and the resulting oscillation of the shaft moves the bar 218 against the edges 219 of the multiplier gears and rotates the gears to zero position. See Fig. 5. This resetting movement of the multiplier gears is utilized, to reset a decimal point indicator 281 that may have been set. A pin 618 is mounted on each multiplier gear and engages a cam 619 on the respective decimal point indicator, upon resetting movement of the gear and sets the indicator to normal position as shown in Fig. 5. The multiplier gears are moved somewhat beyond zero position and will then reset against their holding detents 210. This resetting movement of the gears, moves the pins 618 out of the path of the cams 619 on the decimal point indicators, so that the indicators can be set into indicating position.

Means are provided to reset a decimal point indicator for the register wheels.

A lever 650 is mounted on the shaft 205 and upon oscillation of the shaft, engages the arm 651 of a bail frame 652, which is thereby actuated to release any one of the detents 75 which hold the decimal point plates 50 in upper or set position. This will reset any decimal point plate under the impulse of its spring 58. See Fig. 1.

Means are provided to reset the multiplier cams 417, by the operation of the clear key. See Figs. 5 and 11. It has been described how these cams are rotated or escaped step by step under the impulse of the spring 421 connected to the actuating sector 420 (see Fig. 5).

Figure 22:
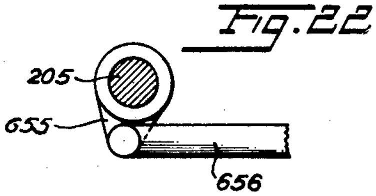
Fig. 22 is a detail of the resetting device for the cams 417.

A short lever 655 is mounted on the shaft 205 and a link 656 extends rearward and a slot in the link engages a pin 657 on the sector (see Fig. 22). Upon oscillation of the shaft 205, the end of link slot will engage the pin on the sector and reset the sector and thereby the cam drum, to normal position, where it will be held by the escapement pawl 415.

I claim:

1. In a calculating machine the combination of a product register comprising register dials, actuators for the register, a series of decimal point indicators for the register dials settable to indicating position, each indicator being individual to and located adjacent a register dial, a setting mechanism for the indicators operable to set an indicator in position for establishing a decimal point in the register dials, a shift mechanism for the indicators operable to reset a set indicator and to set an adjacent indicator, thereby shifting the decimal point position in the register dials, multiplicand indexing mechanism to control the selection and extent of movement of the actuators for the register and comprising a carriage subject to step by step movement, ordinally disposed multiplicand members in said carriage settable to represent a multiplicand, ordinally disposed decimal point members in said carriage settable to represent the decimal point of the multiplicand set up in the multiplicand members, a multiplicand decimal point key operable to set the multiplicand decimal point members, an escapement mechanism for the carriage, multiplicand digit keys operable to set the multiplicand members and to escape the carriage step by step to thereby position the set mutliplicand members in operative relation with the actuators for the register and to position the set decimal point member in operative relation with one of the register decimal point indicators, a back-space mechanism for the carriage to back-space it step by step, means for imparting cyclic operation to the register actuators, followed by the operation of the carriage back-space mechanism, multiplier factor indexing mechanism to control the cyclic operation of the register actuators and comprising ordinally disposed multiplier members having dials settable to represent a multiplier and to control the cyclic operation of the register actuators in accordance with the digits of the multiplier, multiplier digit keys operable to set the multiplier members, a multiplier decimal point key operable in its proper sequence when the multiplier digit keys are operated to set up the multiplier, means operable by the multiplier digit keys and the multiplier decimal point key when either of these keys is the initial key operated in setting up the multiplier, to operate the setting mechanism for the register decimal point indicators, to thereby set the register decimal point indicator that is in operative relation with the multiplicand decimal point member, to indicating position, means operated by the multiplier decimal point key when thus operated as the initial key, to operate the carriage back-space mechanism, means operated by the multiplier digit keys, other than the first multiplier key operation, to operate the shifting mechanism for the register decimal point indicators, and means operated by the multiplier decimal point key, to disable the aforesaid means to operate the register decimal point indicator shift mechanism by the operation of the multiplier digit keys.

2. A calculating machine according to claim 1 including ordinally disposed decimal point indicators for the dials of the multiplier members, selectively settable to represent the decimal point of the multiplier set up in the dials, and means, operated by the multiplier decimal point key, when it is operated in its proper sequence, upon operation of the multiplier keys to set the multiplier members, to set the decimal point indicator that indicates the decimal point of the multiplier shown in the dials.

3. A calculating machine according to claim 2, including a multiplying key operable upon conclusion of the multiplicand and multiplier indexing operation, to initiate multiplying operation, and a clear key, operable upon conclusion of a multiplying operation, to reset the decimal point indicator of the register dials and the multiplier dials.

References Cited in the file of this patent

UNITED STATES PATENTS

| | | |
|---|---|---|
| 809,075 | Rechnitzer | Jan. 2, 1906 |
| 1,503,742 | Bacon | Aug. 5, 1924 |
| 1,580,858 | Schluns | Apr. 13, 1926 |
| 1,799,037 | Bley | Mar. 31, 1931 |
| 2,329,180 | Boyd | Sept. 14, 1943 |
| 2,329,190 | Ellerbeck | Sept. 14, 1943 |
| 2,329,218 | Reynolds | Sept. 14, 1943 |
| 2,379,877 | Britten, Jr. | July 10, 1945 |
| 2,467,419 | Avery | Apr. 19, 1949 |
| 2,538,896 | Britten, Jr. | July 23, 1951 |